United States Patent
Delp et al.

(10) Patent No.: US 7,491,579 B2
(45) Date of Patent: Feb. 17, 2009

(54) COMPOSABLE SYSTEM-IN-PACKAGE INTEGRATED CIRCUITS AND PROCESS OF COMPOSING THE SAME

(75) Inventors: Gary S. Delp, Rochester, MN (US); George Wayne Nation, Rochester, MN (US)

(73) Assignee: LSI Corporation, Milpitas, CA (US)

( * ) Notice: Subject to any disclaimer, the term of this patent is extended or adjusted under 35 U.S.C. 154(b) by 619 days.

(21) Appl. No.: 11/079,028

(22) Filed: Mar. 14, 2005

(65) Prior Publication Data

US 2006/0236270 A1    Oct. 19, 2006

(51) Int. Cl.
*H01L 21/00* (2006.01)
(52) U.S. Cl. ............... 438/107; 257/684; 257/E21.499; 257/E23.01; 257/E21.705
(58) Field of Classification Search .......... 438/107; 257/684, E23.01, E21.499, E21.705; 716/16; 712/223
See application file for complete search history.

(56) References Cited

U.S. PATENT DOCUMENTS

| | | | |
|---|---|---|---|
| 2002/0026539 A1 | 2/2002 | Muthukumaraswamy | 710/32 |
| 2002/0066956 A1 | 6/2002 | Taguchi | 257/734 |
| 2002/0122386 A1 | 9/2002 | Calvignac | 370/232 |
| 2003/0062922 A1 | 4/2003 | Douglass | 326/39 |
| 2004/0015502 A1* | 1/2004 | Alexander et al. | 707/100 |
| 2006/0036774 A1* | 2/2006 | Schott et al. | 709/251 |

OTHER PUBLICATIONS

Dave Bursky, "Platforms Get Extreme for Storage, High-Speed I/O", Electronic Design, Nov. 29, 2004 www.elecdesign.com (3 pages).
Roger Allan, "SiP Really Packs It In", Electronic Design, Nov. 29, 2004 www.elecdesign.com (9 pages).

* cited by examiner

*Primary Examiner*—Caridad M Everhart
(74) *Attorney, Agent, or Firm*—Westman Champlin & Kelly

(57) ABSTRACT

An SIP for performing a plurality of hard and soft functions comprises standard IC die and custom platforms mounted to a substrate. Die are identified for each standard hard function, such as memory, processing, I/O and other standard functions and one or more user-configurable base platforms are selected that, when configured, execute the custom soft functions. Optionally, the substrate is laminated to the die and the platforms are attached to the substrate. Testing is performed by defining the configured base platforms coupled to logic representing the die and their connections and performing placement and timing closure on the combination.

20 Claims, 4 Drawing Sheets

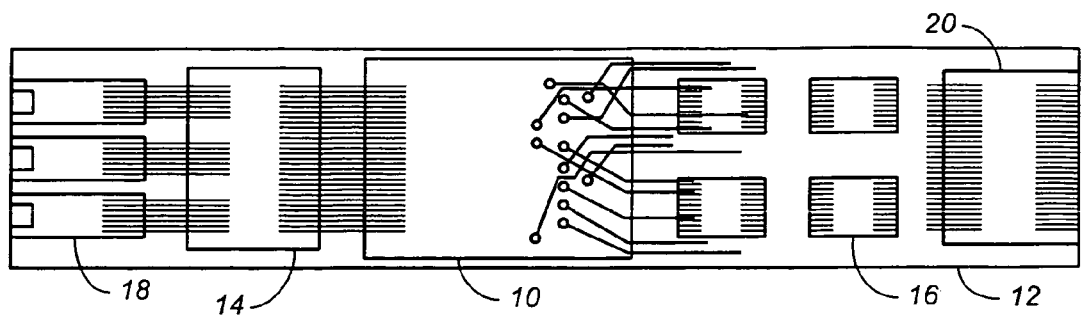
FIG._1
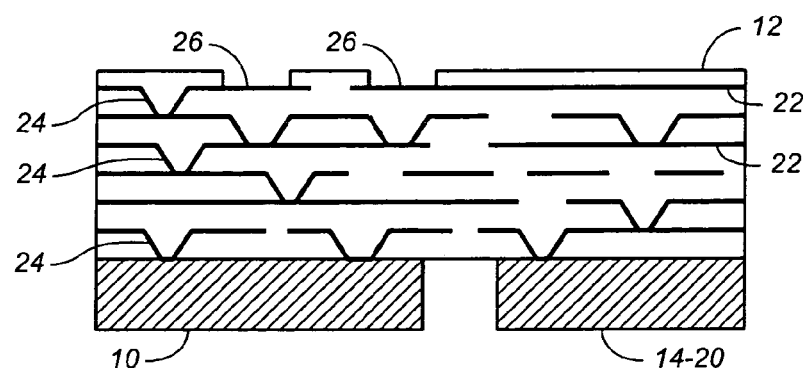
FIG._2
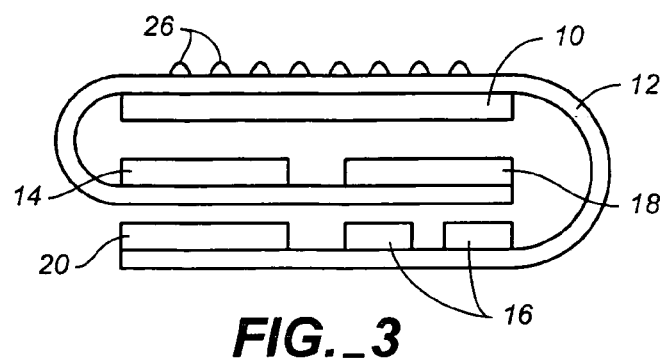
FIG._3

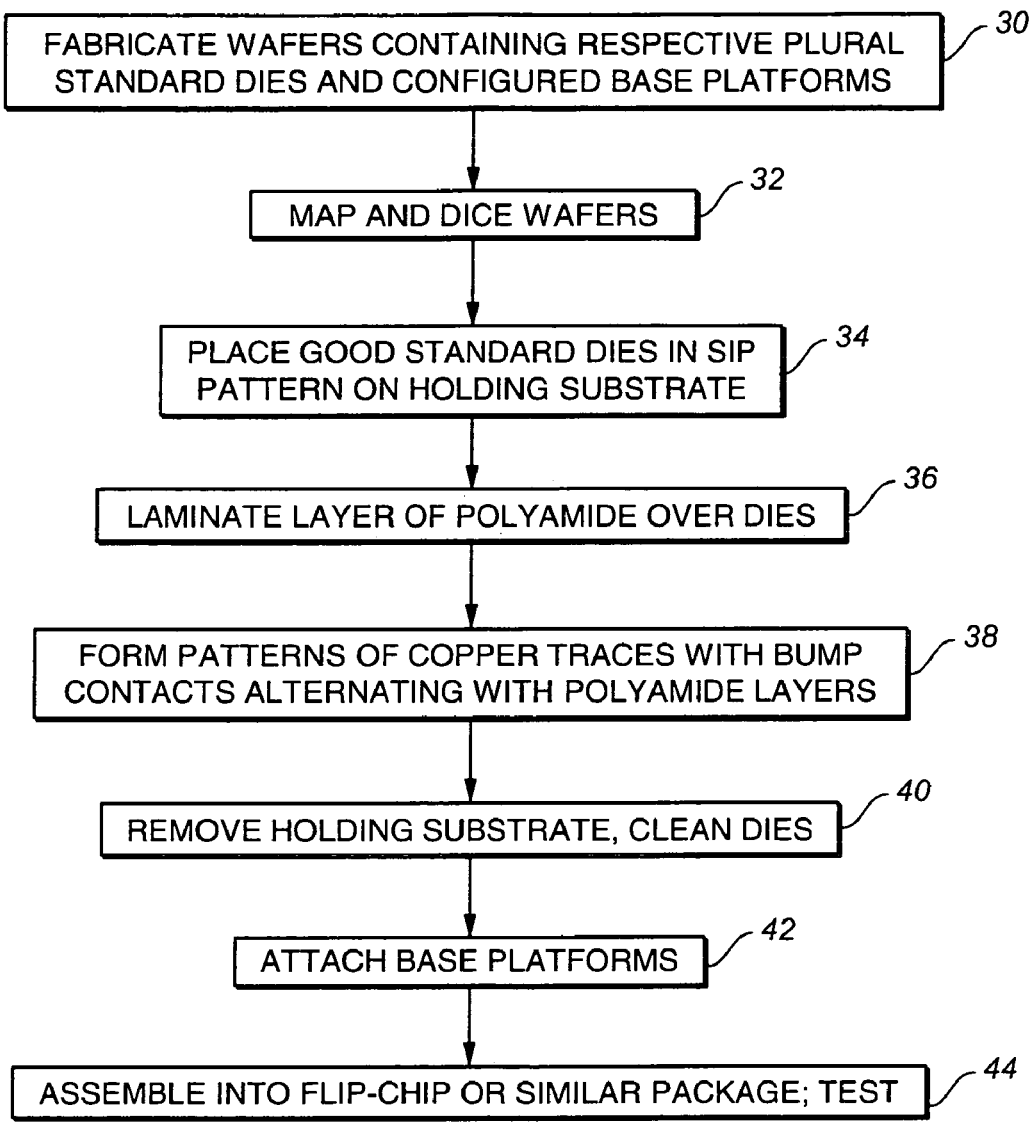
FIG._4

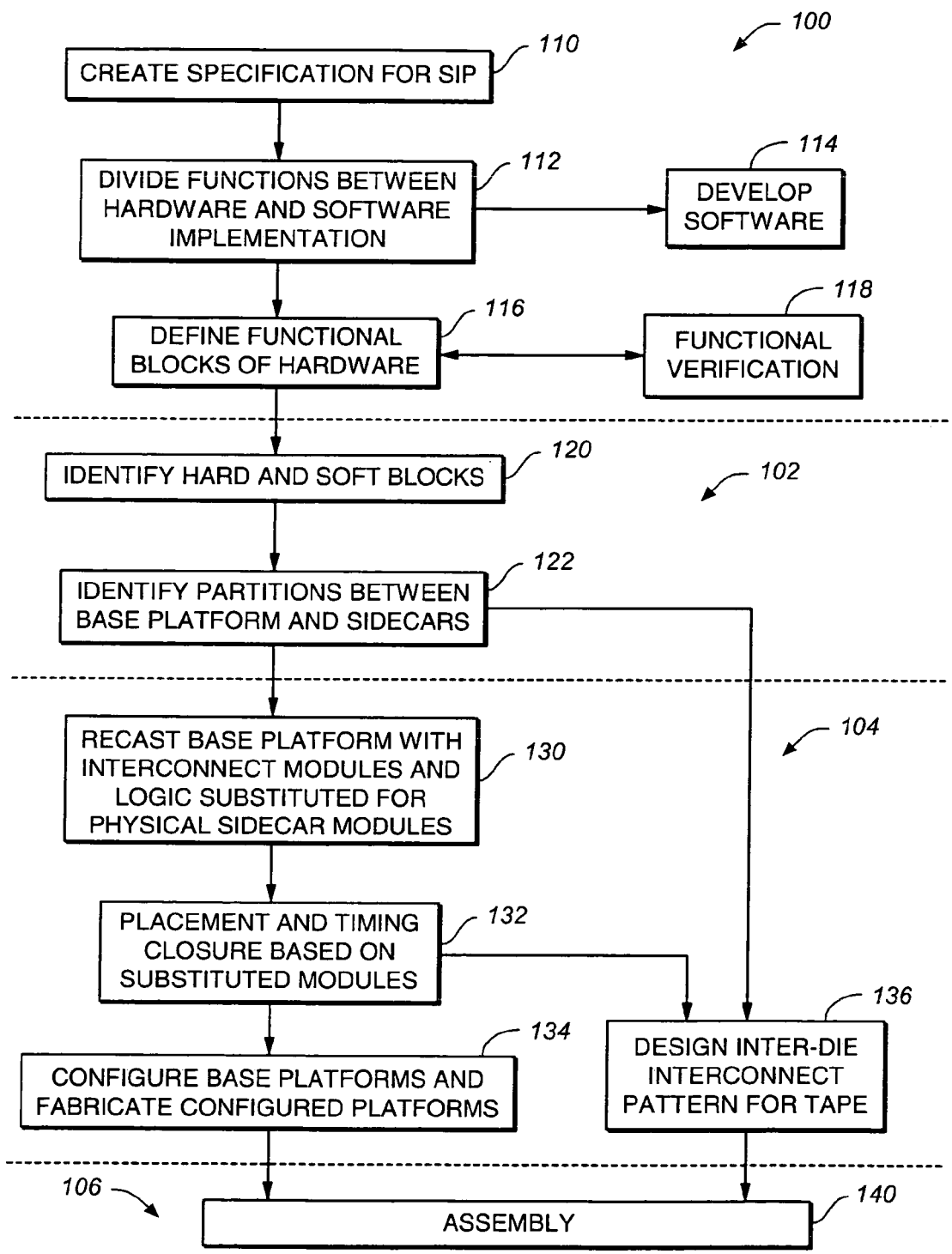
FIG._5

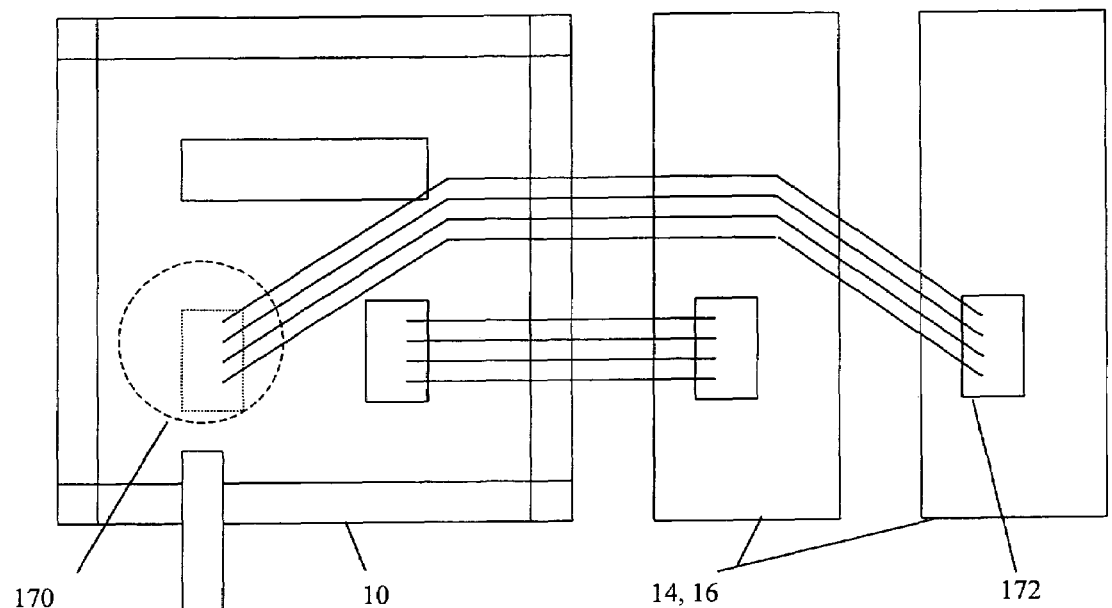
FIG. 6
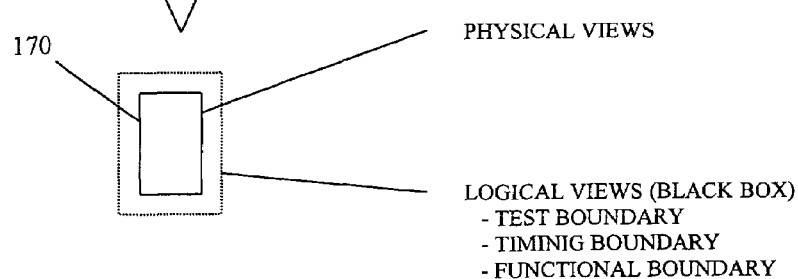

COMPOSABLE SYSTEM-IN-PACKAGE INTEGRATED CIRCUITS AND PROCESS OF COMPOSING THE SAME

FIELD OF THE INVENTION

This invention is related to integrated circuits (ICs), and particularly to composable system-in-package (SIP) constructions consisting of configurable base platforms and standard ICs.

BACKGROUND OF THE INVENTION

Integrated circuits (ICs) are used in a wide range electronic devices produced by a large number of system manufacturers. ICs are seldom manufactured (fabricated) by the system manufacturer, or the electronic device designer. Instead, ICs are manufactured by an IC foundry to the specifications of the electronic device designer and assembled by the system manufacturer.

Prior to the development of base platforms, described below, IC foundries supplied design tools to device designers to enable device designers to design ICs that incorporated circuit designs unique to the device designer. The design tools were tailored to the IC foundry's technology to enable the device designer to complete an IC design without knowledge of the details of the fabrication technology.

More recently, IC foundries developed base platforms that are configurable to meet the device designer's requirements. The base platform contained layers of semiconductor, such as silicon layers, with hardmacs and a transistor fabric diffused into the semiconductor, but without metal interconnection layers. The hardmacs were composed of embedded transistors and other electronic elements diffused into the semiconductor to form standard circuit elements, such as memories, transceivers, processors, converters, input/output (I/O) modules, etc. The transistor fabric comprised an array of pre-diffused transistors arranged in a grid pattern and configurable to custom logic and memory. An example of a transistor fabric is described in U.S. Pat. No. 6,823,499 for "Method for Designing Application Specific Integrated Circuit Structures" by Vastisha and Delp and assigned to the same assignee as the present invention.

Some base platforms contained configurable logic blocks (CLBs) that could be configured into field-programmable gate array devices (FPGAs) by a configuration program fabric to perform specific functions for which the FPGA was designed. In some cases, regions were provided on the base platform to receive custom circuit portions. The custom logic, custom memories, custom circuit portions and configuration program fabric are called customer intellectual property, or customer IP.

Based on a functional design, and using tools supplied by the IC foundry or agent, the device designer produced one or more metallization layers for the base platform to configure the transistor logic into custom logic and memory, to create one or more configuration memories that contain firmware to configure the CLBs (if any), and to interconnect the circuit elements, thereby configuring the platform into a custom IC.

In use, the user selected a base platform containing hardmacs, transistor fabric, CLBs as appropriate and regions for custom circuit portions as appropriate. The base platform was selected so that when configured, the resulting configured platform met the user's requirements for the needed IC. Using tools supplied by the IC foundry, the user defined the metallization layer(s) to interconnect the elements and configure the transistor logic and CLBs to create custom logic and memory in the platform begin configured into a custom IC. Hence, the user created the customized logic and/or FPGA in the form of a configured platform having the metal interconnect layers and firmware (for FPGAs) to meet the device designer's requirements.

There is a wide range of types of ICs. Consequently, foundries provided families of base platforms to perform various functions, with members of the families providing specific sets and arrangements of diffused elements. The user selected a base platform and customized it to configure it into a configured platform best meeting the user's needs. As used herein, the term "base platform" refers to a platform yet to be configured into a functional IC by metallization layers, custom logic and memory in the transistor fabric, custom circuit portions in the defined regions and program fabric for CLBs (for FPGAs). The term "configured platform" refers to a functional device formed from a base platform and the included metallization layers. Examples of such configurable base platforms are the RapidChip® slices available from LSI Logic Corporation of Milpitas, Calif. RapidChip slices permit the development of complex, high-density ICs in minimal time with significantly reduced design and manufacturing risks and costs.

In practice, the selected base platform contained hardmacs that were not used in the completed design. Nevertheless, the benefits of reduced cost and time to fabricate configured platforms fabricated from base platforms offset the slightly larger size of those platforms due to unused elements.

Platform suppliers have found it necessary to maintain and support growing numbers of base platform families and family members. More particularly, the number of base platforms proliferated to meet growing user requirements, adding to the expense of the families of platforms and the tools to support them. It is, therefore, desirable to reduce the number of base platforms while extending the range of platform families. The present invention is directed to a novel base platform and to its combined use with standard die to create composable system-in-package constructions. Consequently fewer base platforms are required for each family of platforms, resulting in lower costs of creating and supporting the families of platforms.

SUMMARY OF THE INVENTION

In one embodiment, the invention provides a base platform design for a configurable integrated circuit platform. The design defines memory for storing a plurality of bits of data and a diffused transistor fabric containing a plurality of transistors. The transistor fabric is configurable by the addition of at least one metallization layer to the platform to selectively connect transistors of the transistor fabric into logic and/or memory. At least some hardmac functions required for a functional circuit are absent from the platform design. Necessary hardmac functions absent from the platform design include one or more of input/output, large memory and processing.

The transistor fabric is configurable to execute functions by the addition of metallization layers to the platform selectively connecting the transistor fabric into logic and/or memory. The configurable logic blocks, if any, are configurable by firmware resident off the platform to execute functions on signals.

In another embodiment of the invention, SIPs are designed capable of performing a plurality of hard and soft functions. Standard IC die are identified for executing each hard function, such as memory, processing, I/O and other standard functions. One or more user-configurable base platforms are selected that, when configured, are capable of executing the custom soft functions. The selected base platforms are configured to platforms to perform the soft functions. An SIP substrate having conductive traces is attached to the die for connection to other die and to the platform. The configured platforms are assembled to complete the package.

In some versions of this embodiment, the substrate is constructed by laminating a layer of SIP substrate insulator material, containing conductive vias, on each die, and forming alternate layers of conductive traces and SIP substrate insulator material over the die to interconnect the die and contacts for the platform.

Also in some versions of this embodiment, the package is tested by defining a configuration of the base platforms coupled to logic representing the die and their connections, and performing placement and timing closure on the defined base platforms and die logic.

Another embodiment of the invention is a SIP in which a plurality of die performs one or more functions selected from the group comprising memory, processing, input/output, and converting. At least one base platform has one or more user-defined metallization layers coupling a diffused transistor fabric of the platform to perform one or more functions of logic and memory. A substrate supports the die and platforms and contains layers of conductive trace separated by via-containing insulation, the traces selectively coupling the die and platforms.

BRIEF DESCRIPTION OF THE DRAWINGS

FIGS. 1-3 illustrate a system-in-package (SIP) according to the present invention.

FIG. 4 is a flowchart of a process of assembling the SIP illustrated in FIGS. 1-3.

FIG. 5 is a flowchart of a process of designing an SIP according to the present invention.

FIG. 6 illustrates a how a designer can abstract sidecar functions for designing a platform die for an SIP according to the present invention.

DETAILED DESCRIPTION OF THE PREFERRED EMBODIMENTS

The invention is directed to a system-in-package (SIP) composed of a substrate supporting one or more selected base platform(s) according to the present invention and a plurality of standard die providing functions. The substrate, which in preferred embodiments is a flexible substrate, includes signal and power interconnections between the platform(s) and die, with connections, such as bump contacts, to the platform(s) and die.

FIG. 1 is a plan view, and FIG. 2 is a section view, illustrating the concepts of a SIP according to the present invention. A configured platform 10, configured to an ASIC and/or FPGA, is attached to substrate 12, which in turn contains embedded signal and power lines. Platform 10 is configured by metallization layers added to the platform to meet a user design and an off-platform FPGA program fabric (in the case of platforms as FPGAs). It is understood that a given platform might form both ASICs and FPGAs, and the term "platform"encompasses ASIC, FPGA and combination ASIC/FPGA platforms. A combination base platform having ASIC and FPGA functions is more fully described in application Ser. No. 11/079,439, filed on Mar.14, 2005by Gary S. Delp and George Wayne Nation for "Base Platforms with Combined ASIC and FPGA Features and Process of Using Same"and assigned to the same assignee as the present invention, the content of which is hereby incorporated by reference in its entirety. It will also be appreciated that a given substrate 12 might support plural platforms 10 that may or may not be similar.

One difference between base platforms according to the present invention and prior base platforms is that base platforms according to the present invention do not include many hardmacs required by the completed circuit, namely standard input/output modules, high-speed serializer/deserializer interconnects (SERDES), standard processors, FPGA program fabrics, large memories, matrix RAMs (such as described in U.S. Pat. No. 6,804,811 for "Process for Layout of Memory Matrices in Integrated Circuits" by Andreev et al. and assigned to the same assignee as the present invention), and the like. Instead, standard die are attached to substrate 12 to perform the functions of standard and custom circuit elements, such as large memories 14, including matrix RAM, SERDES 16, processors 18, as well as discrete circuits 20. The standard die are selected from a library of die provided by the IC foundry or are die that perform custom functions of the device designer that can be economically configured in a die. Processors 18 include arithmetic processors as well as standard logic processors; custom logic is formed of the transistor fabric on the platform 10. In the case of CLBs forming FPGAs, firmware is burned into one or more configuration memory die for configuring the CLBs. Signal routing traces in substrate 12, diagrammatically illustrated at 22, 24, interconnect the circuit elements 14-20 to each other and to platform(s) 10.

Substrate 12 is preferably a multilayer flexible laminate formed of alternate layers of insulating material containing copper vias and conductive copper, arranged so that the copper forms conductive routing traces 22 and contacts 24 for interconnection, power, customization and signal routing between circuit elements 14-20 and platform 10. Contacts 24 are positioned in substrate 12 to receive and connect to corresponding contacts on platform 10 and circuit elements 14-20, and traces 22 are routed between the contacts to provide signal and power routing. Contacts 26 provide connection to external circuits. As shown in FIG. 3, the flexible tape forming substrate 12 may be wrapped to form a compact package of SIP.

FIG. 4 is a flowchart illustrating a process of composing the SIP package shown in FIG. 3 according to an embodiment of the present invention. At step 30, wafers are fabricated containing a plurality of standard die of a given type. Thus, some wafers will contain SERDES 16, others will contain processors 18. Some wafers will contain configured platforms 10 designed using the process of FIG. 5. Wafer fabrication technology is well known to those skilled in the art and the specific technology to construct die and platforms is not necessary to the understanding of the present invention. Moreover, the nature of specific die constructed is also not necessary to understand the present invention, except to note that the die are of standard pre-existing circuits that form portions of the finished SIP. Each wafer might contain a plurality of die that perform SERDES, or processing, or memory, or FPGA fabric, or A/D and/or D/A conversion, or I/O, etc. In some cases, the die might also include pre-existing custom circuits fabricated to the design and specification of a device designer.

At step 32, each wafer is mapped to identify good die or configured platforms, and the wafer is diced into individual die or platforms. At step 34, selected good die from various wafers are attached to a temporary holding substrate, such as a silicon substrate. The die are attached to the holding substrate so that the die contacts are exposed in a pattern for connection to matching contacts 24 to be formed in substrate 12 and interconnection between the die and to the configured platform to be attached.

At step 36, a layer 20 of flexible insulating material is laminated to the contact side of die 14-20. At step 38 layer 20 is etched to expose the die contacts, and a patterned copper layer is formed over layer 20 to form traces 22 and contacts 24 on and through layer 20 using photolithographic processes well known in the art. Contacts 24 are in a pattern to connect to contacts on the die and platform(s), and traces 22 are in a pattern to provide connection to other contacts 24 to other die, to contacts 24 for connection to platform 10, and to contact pads 26 for connection to external circuitry and power. The photolithographic process of step 38 is repeated for alternate layers of insulating material and copper to form traces 22 and contacts 24 until the desired interconnection pattern is completed to contacts 24 for connection to platform 10 and to pads 26 for connection to external circuitry. Traces 22 provide signal layers, mesh planes and connection to contacts 24 and pads 26

At step 40, the holding substrate is removed from the die, and the exposed surfaces of the die are cleaned and polished. At step 42, one or more platforms 10 are attached to contact pads 26. Platform 10 is a configured platform with metallization layers. At step 44 the substrate fabric is wrapped as shown in FIG. 3 to complete the SIP package, and the completed package assembled to a flipchip or wirebond package or the like, tested for meeting specifications and delivered to the system manufacturer for assembly into an electronic device.

The base platform 10 according to the present invention is similar to prior base platforms, with principal differences manifest in memory location and the manner that memory is supported. Prior base platforms included both large standard memory and small memory, standard processors, SERDES, FPGA programs and standard discrete circuits such as A/D and D/A converters, as well as base logic, transistor fabric used for user-defined custom logic and memory, and CLBs (in the case of FPGA-type platforms). Base platforms according to the present invention do not include large standard memory, standard processors, SERDES, FPGA program fabric and standard discrete circuits, but do include small custom memories, base logic, transistor fabric and CLBs (for FPGA-type platforms).

The ratio of the number of transistors in the transistor fabric to the number of bits in diffused memory in prior base platforms was not greater than one transistor for each bit of diffused memory (between 0.65:1 and 1:1). Base platforms according to the present invention are characterized by having more than one transistor in the transistor fabric for each bit of diffused memory. Consequently, a greater number of transistors are available for custom logic and memory than in prior base platforms of comparable size. In preferred embodiments of base platforms according to the present invention, the number of transistors for each bit of diffused memory is between 1.4:1 and 1.7:1.

A second distinction of the base platforms according to the present invention is that matrix RAM memory, constructed of transistor fabric in prior base platforms are largely removed to separate standard die. Consequently, the platform of the present invention provides greater flexibility in the placement, number and size of matrix RAM.

A third distinction is that the base platforms of the present invention have no large memories, since they are incorporated in standard die 14 (FIG. 1) attached to the substrate fabric. This is particularly advantageous, since the number of members of a family of base platforms is minimized and a given member can be coupled with one or more standard memory die 14 of various sizes to meet the equivalents of several prior base platforms.

In accordance with the present invention, standard circuit modules, such as memory, processors, matrix RAM, I/O modules and discrete circuits are embodied in separate standard die, which, when coupled to a configured platform according to the present invention, form an integrated circuit system in a package (SIPs). Most advantageously, with fewer base platforms in each family, costs of base platform generation and support is minimized. The IC foundry will need to supply tools to support the base platforms of the present invention to enable users, such as device designers, to design SIPs, including selection of standard die, but overall the number and support of tools is reduced due to the reduced number of base platforms. Preferably, the platforms, and in some cases the die, are designed with over-provisioning of transistor fabric and other functions to permit new functions to be added to future versions of a die or configured platform, or expansion of existing functions, without significant timing and placement issues.

FIG. 5 is a flowchart of the process of SIP composition according to the present invention. The process is segmented into four sections. At section 100 the design specification is created. At section 102 the hardware components are partitioned to specific die or platform. At section 104 the physical design of the base platform is created. At section 106 the SIP is assembled.

At step 110 a functional specification is created for the SIP to be fabricated. At step 112, the functions of the SIP are separated into hardware (including firmware) and software functions. Software is separately developed at step 114. At step 116, functional blocks of hardware (including firmware) are defined. The hardware design is functionally verified at step 118, and the functional blocks are modified until a satisfactory verification is achieved.

In parallel with the completion of a verified functional description of the hardware design, the process continues to section 102 and the partition of the hardware components. At step 120, the hardware functions are separated into hard and soft functions. A hard function is one that can be executed by a standard circuit die from the foundry's standard die library or a pre-existing user-defined die. The soft function is one requiring custom logic or memory.

At step 122, the functions are assigned to die and platforms. Each hard function is assigned to the smallest or first die capable of executing the function, with some allowance for addition of future functions. These die, called "sidecars," are standard die selected from the foundry's die library and pre-existing user-defined die. In the case of FPGA capabilities to the configured platform, firmware for the FPGA functions may be fixed (burned) into at least one of the memory die in a manner well known in the art. All die have pre-configured contact patterns that can be replicated on substrate 12, and known performance that can be duplicated in pre-defined logic.

The soft functions are analyzed at step 122 to identify a base platform with the features that, when configured, are adequate to execute the soft functions. The selection of the base platform employs much the same criteria as selection of prior base platforms were selected to perform functions for configured prior platforms. In most cases, the selected base platform will include excess functions for future changes and improvements to the circuit. As described in the aforementioned Delp et al. application, some embodiments of the platform include extra FPGA signal interfaces to bypass ASIC logic for functional replacement in FPGA by a post-design update of the control logic in the FPGA.

Upon completion of the selection of die and platforms and assignment of functions to the die and platforms, the process continues to the physical design of the base platform and the interconnection for the substrate tape (substrate 12 in FIG. 1) for configuration in the SIP. At step 130, the base platform description is recast, or re-defined, to the soft functions assigned to it with the pre-defined logic equivalent to the die and interconnect modules substituted for the die and hard functions assigned to the die. Thus, step 130 identifies the configurations of metallization layers to be applied to the base platform for the SIP. The metallization layer design and firmware (if any) are emulated at step 130 to create a functional design for a configured platform 10.

At step 132, the base platform is synthesized and timing and placement closure is performed, improving the base platform design in a manner well known in the art. At step 134 the finalized platform design is applied to the selected base platform to configure the platform into a functional configured platform 10.

At step 136, the platforms 10 are fabricated in a wafer based on the design, resulting in configured platform dies for assembly to the SIP. The configured platforms and the die selected at step 122 are employed to design inter-die interconnect patterns for the flexible substrate 12 (FIG. 1) in accordance with the process illustrated at FIG. 4 and shown in FIGS. 1-3, particularly steps 30-40 of FIG. 4. Thus, at step 136, the pattern of traces between contacts for die placement and between die and the platform are created to connect the die to each other and the platform to meet the functional specifications for the hardware created at step 110.

After fabrication of platforms 10 and fabrication of substrate 12, the process continues to section 106 where, at step 140, the platforms are assembled to the substrate as described in step 42 in FIG. 4 to complete the SIP. Thereupon, software developed at step 104 is applied to the completed SIP.

One aspect of the composable system in package is the ability to treat a sidecar die 14, 16 as variable black boxes. As shown in FIG. 6, the physical view at the package level is different from the physical view at the hard macro level. More particularly, a hard macro 170 is the on-die proxy for an off-die function 172 performed by sidecar 14, 16. This enables the designer to view the physical and logical aspects of the sidecar dies for ease integration of the SIP. Thus, the views available to the designer are physical—the hardmac, timing, an ETM extraction, block placement, and FRAM view, and logical, namely a simulation model of the off-die function. By abstracting the sidecar functions in these various ways, the task of integration to the SIP is streamlined.

The present invention thus provides a system-in-package defining an integrated circuit comprising a configurable base platform that is configured by user definitions and operable with standard die that provide standard processor, memory, I/O, converter and discrete functions. Where the configured platform is an FPGA, the configuration can be modified for future versions of the circuit by substituting a modified memory die containing upgraded firmware, thus minimizing expenses associated with re-working an entire IC chip for upgrade purposes. Where the configured platform is an ASIC, the revised metallization layer for upgrades in function can be achieved with minimal expense, since the standard die are unchanged.

One particularly advantageous feature of the invention results from reduced effects of capacitance on the logic circuits of the configured base platform due to the absence of large memory. More particularly, it is well known that memory is a major source of parasitic and stray capacitance that degrade signals in ICs. By moving large memories to standard die, parasitic and stray capacitance within the base platform is minimized. Additionally, routing blockages are reduced in the memory area. Moreover, because the memory is off-die, the memory footprint is substantially reduced.

Although the present invention has been described with reference to preferred embodiments, workers skilled in the art will recognize that changes may be made in form and detail without departing from the spirit and scope of the invention.

The invention claimed is:

1. A base platform design for a configurable integrated circuit platform defining memory for storing a plurality of bits of data and a diffused transistor fabric containing a plurality of transistors, the transistor fabric being configurable by the addition of at least one metallization layer to the platform to selectively connect transistors of the transistor fabric into logic and/or memory, the base platform design being characterized by the absence of hardmac functions required for a functional circuit, the hardmac functions being selected from the group consisting of input/output, large memory and processing, wherein a ratio of the number of transistors in the transistor fabric to the number of bits of the memory in the base platform design is between about 1.4:1 and 1.7:1.

2. The platform design of claim 1, further including a plurality of configurable logic blocks configurable by firmware off the platform.

3. The platform design of claim 1, further including at least one standard integrated circuit for coupling to the configured platform to execute the hardmac functions absent from the platform.

4. A process of designing a system-in-package (SIP) capable of performing a plurality of hard and soft functions comprising steps of:
   a) identifying one or more standard integrated circuit die collectively capable of executing the hard functions, each die having a respective die contact pattern, each die function being representable by respective die logic;
   b) selecting one or more user-configurable base platform designs that, when configured, define a configured platform capable of executing the soft functions;
   c) configuring the one or more selected base platform designs and fabricating one or more corresponding configured platforms to perform the soft functions, the configured platforms having respective platform contact patterns;
   d) attaching an SIP substrate to the one or more die and one or more platforms, the SIP substrate comprising:
      patterns of substrate contacts corresponding to die contact patterns of the identified die and platform contact patterns of the selected platforms, and
      conductive traces interconnecting the substrate contacts, the die contacts of the one or more die electrically engaging substrate contacts corresponding to the respective die contact patterns and the platform contacts of the one or more configured platforms electrically engaging substrate contacts corresponding to the respective platform contact patterns.

5. The process of claim 4, wherein step d) comprises steps of
   forming the SIP substrate onto one or more die, and
   attaching the one or more platforms to the formed substrate.

6. The process of claim 4 further comprising, before step a), a step of:
   separating the functions to be performed by the SIP into hard functions and soft functions.

7. The process of claim 4 further comprising, before step e), steps of:
 defining a configuration of the base platforms coupled to the die logic, and
 performing placement and timing closure on the defined base platforms and die logic.

8. The process of claim 4, wherein the hard functions are selected from the group consisting of memory, input/output, processors and discrete functions.

9. The process of claim 4, wherein a ratio of the number of transistors in a transistor fabric of the one or more base platform designs to the number of bits of memory in the one or more base platform designs is between about 1.4:1 and 1.7:1.

10. The process of claim 4, wherein the substrate is flexible, and the process further comprises:
 assembling the assembled substrate, die and platform into an SIP package.

11. The process of claim 10, wherein the SIP package is selected from the group comprising flipchips and wirebond.

12. The process of claim 4, wherein step d) comprises steps of:
 d1) laminating a first layer of SIP substrate insulator material on at least one surface of at least each die to cover the die contacts,
 d2) forming alternate layers of conductive traces and SIP substrate material over the die with first conductive contacts in the SIP substrate material engaging the die contacts on each die and second conductive contacts in the SIP substrate material corresponding to platform contact patterns of the selected platforms, the traces interconnecting the first and second conductive contacts.

13. The process of claim 12, further comprising, before step d1), a step of:
 placing the die on a holding substrate in a desired pattern, and after step d2), a step of
 removing the holding substrate.

14. The process of claim 12, wherein the SIP substrate material is a polyamide.

15. The process of claim 12, wherein the hard functions are selected from the group consisting of memory, input/output, processors and discrete functions.

16. A system-in-package comprising:
 at least one standard integrated circuit die for performing one or more hard functions selected from the group comprising memory, processing, input/output, and converting, the at least one standard integrated circuit die having die contacts providing electrical connection to circuit elements within the die;
 at least one base platform having at least one user-defined metallization layer coupling a diffused transistor fabric of the platform to perform one or more user-configurable soft functions selected from the group comprising logic and memory, the base platform having platform contacts providing electrical connection to circuit elements within the respective platform; and
 a flexible substrate supporting the at least one standard integrated circuit die and the at least one base platform and containing layers of conductive trace separated by insulation, the traces selectively coupling the die contacts and platform contacts, wherein the flexible substrate is wrapped to form a compact, system-in-package.

17. The system-in-package of claim 16, wherein the base platform comprises a transistor fabric, the at least one metallization layer coupling the transistor fabric to perform logic function.

18. The system-in-package of claim 16, wherein the base platform comprises configurable logic blocks programmable to perform logic functions, at least one of the standard integrated circuit die containing firmware providing program instructions to the logic blocks.

19. The system-in-package of claim 16, wherein the at least one base platforms contains user-defined circuitry and each at least one standard integrated circuit die is selected from a library of die.

20. The system-in-package of claim 16, wherein a ratio of the number of transistors in the transistor fabric of the at least one base platform to the number of bits of memory in the at least one base platform design is between about 1.4:1 and 1.7:1.

* * * * *